United States Patent
Koyama et al.

(10) Patent No.: US 12,273,796 B2
(45) Date of Patent: Apr. 8, 2025

(54) IMAGE READER AND METHOD OF SETTING WIRELESS SETUP INFORMATION FOR IMAGE READER

(71) Applicant: Seiko Epson Corporation, Tokyo (JP)

(72) Inventors: Osamu Koyama, Matsumoto (JP); Nobutaka Suzuki, Shiojiri (JP); Masatomo Kanamitsu, Kitakyushu (JP); Junichiro Higuma, Kitakyushu (JP); Hideaki Tokuda, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 17/653,074

(22) Filed: Mar. 1, 2022

(65) Prior Publication Data
US 2022/0286577 A1 Sep. 8, 2022

(30) Foreign Application Priority Data
Mar. 4, 2021 (JP) ................................ 2021-034154

(51) Int. Cl.
| | |
|---|---|
| H04N 1/327 | (2006.01) |
| G06K 7/14 | (2006.01) |
| H04N 1/00 | (2006.01) |
| H04N 1/32 | (2006.01) |
| H04W 4/50 | (2018.01) |
| H04W 76/10 | (2018.01) |
| H04W 84/12 | (2009.01) |

(52) U.S. Cl.
CPC ............ *H04W 4/50* (2018.02); *G06K 7/1408* (2013.01); *H04W 76/10* (2018.02); *H04N 2201/0048* (2013.01); *H04N 2201/0081* (2013.01); *H04W 84/12* (2013.01)

(58) Field of Classification Search
CPC ....... H04W 4/50; H04W 76/10; H04W 84/12; G06K 7/1408; H04N 2201/0048; H04N 2201/0081
See application file for complete search history.

(56) References Cited

U.S. PATENT DOCUMENTS

| | | | | |
|---|---|---|---|---|
| 8,849,953 | B2* | 9/2014 | Fukuda | H04M 3/5166 709/217 |
| 9,398,624 | B2 | 7/2016 | Yamamoto | |
| 9,756,450 | B1* | 9/2017 | Carrera | H04W 12/041 |
| 11,295,163 | B1* | 4/2022 | Schoner | G06K 7/1447 |
| 11,769,027 | B1* | 9/2023 | Lopez | E03F 5/041 235/375 |
| 2004/0032624 | A1* | 2/2004 | Stevens | H04N 1/32512 358/1.15 |
| 2006/0122988 | A1* | 6/2006 | Arrouye | G06F 16/168 |
| 2006/0208088 | A1* | 9/2006 | Sekiguchi | G06K 7/1095 235/472.02 |

(Continued)

FOREIGN PATENT DOCUMENTS

JP 2013-143616 7/2013

*Primary Examiner* — Steven Lim
*Assistant Examiner* — Son M Tang
(74) *Attorney, Agent, or Firm* — WORKMAN NYDEGGER (57) ABSTRACT

A control unit of an image reader executes OCR (optical character recognition processing) on image data as a result of scanning a setup guide, and upon acquiring an SSID and an encryption key, attempts to communicate with a corresponding wireless LAN master device using the SSID and the corresponding encryption key.

8 Claims, 6 Drawing Sheets

(56) References Cited

U.S. PATENT DOCUMENTS

| | | | |
|---|---|---|---|
| 2010/0118344 A1* | 5/2010 | Asano | H04N 1/00408 358/1.15 |
| 2011/0019216 A1* | 1/2011 | Kataoka | H04N 1/00244 358/1.15 |
| 2012/0023012 A1* | 1/2012 | Brousseau | G06Q 20/10 707/754 |
| 2012/0211559 A1* | 8/2012 | Okuyama | H04M 1/2755 235/375 |
| 2013/0176956 A1* | 7/2013 | Yamamoto | H04W 76/10 370/329 |
| 2014/0002859 A1* | 1/2014 | Isoda | H04N 1/00225 358/1.15 |
| 2015/0016305 A1* | 1/2015 | Douer | H04W 48/16 370/254 |
| 2015/0138393 A1* | 5/2015 | Ito | H04N 5/445 348/231.2 |
| 2016/0057161 A1* | 2/2016 | Li | H04L 63/0236 726/1 |
| 2016/0062975 A1* | 3/2016 | Yamahara | G06F 21/31 715/224 |
| 2016/0330710 A1* | 11/2016 | Liu | G06K 7/1417 |
| 2017/0078876 A1* | 3/2017 | Jiang | H04W 12/02 |
| 2017/0257475 A1* | 9/2017 | Zong | H04L 63/0428 |
| 2018/0211250 A1* | 7/2018 | England | G06Q 20/223 |
| 2021/0092155 A1* | 3/2021 | Wang | H04L 63/083 |
| 2022/0286577 A1* | 9/2022 | Koyama | H04N 1/32767 |
| 2023/0216970 A1* | 7/2023 | Nonaka | H04N 1/00718 358/448 |

\* cited by examiner

IMAGE READER AND METHOD OF SETTING WIRELESS SETUP INFORMATION FOR IMAGE READER

The present application is based on, and claims priority from JP Application Serial Number 2021-034154, filed Mar. 4, 2021, the disclosure of which is hereby incorporated by reference herein in its entirety.

BACKGROUND

1. Technical Field

The present disclosure relates to an image reader and a method of setting wireless setup information for the image reader.

2. Related Art

JP 2013-143616 A discloses a wireless communication terminal 100 reading connection setup information for connecting to an access point 200 including a plurality of identifiers, storing the connection setup information thus read, reading out the connection setup information thus stored, and setting up the wireless communication connection with the access point 200 by using the identifier notified from the access point 200 and the connection setup information thus read.

For the reading, a method is disclosed in which a graphic or a code such as a barcode and a two-dimensional code having the connection setup information written therein is read using a camera or a code reader.

An existing scanner is provided with a small display. The connection setup information has been input using this display as well as several push buttons and a touch screen.

The technique disclosed in JP 2013-143616 A requires the graphic or the code such as a barcode or a two-dimensional code, in which the connection setup information is written, to be read using a camera or a code reader, and thus requires a separate device for the reading. It is extremely important for the reading and setting procedure to be easily understandable to a user, but this point has not been disclosed in known techniques.

With a configuration requiring an operation of providing an instruction to the user through the small display, the amount of displayable information is limited meaning that the improvement in operability is limited.

As described above, the operation of performing wireless setup with the image reader such as a scanner has been complex, and thus has been desired to be implemented as easily as possible.

SUMMARY

According to a configuration of the present disclosure, an image reader includes a scanning unit configured to read an original document provided with an image and convert the image into image data, a control unit configured to control the reading of the image by the scanning unit, and a wireless communication unit using a wireless LAN. The control unit is configured to execute optical information recognition processing on the image data, and causes the scanning unit to read an original document provided with wireless setup information allocated to a wireless LAN master device and to execute the optical information recognition processing on image data of the wireless setup information read, to recognize predetermined information and acquire wireless setup information for connection to the wireless LAN master device based on the character information acquired.

According to the present disclosure including the configuration described above, the scanning unit reads an original document provided with wireless setup information allocated to the wireless LAN master device and the optical information recognition processing is executed on image data of the wireless setup information read, to recognize character information provided and graphic information and acquire wireless setup information for connection to the wireless LAN master device based on the character information and graphic information acquired. The operator only needs to perform an operation of reading the original document provided with the wireless setup information. An operation of entering a character string of the wireless setup information can be omitted.

According to a configuration in another aspect of the present disclosure, a display unit is included, and the control unit causes the display unit to display a screen that prompts the reading, by the scanning unit, of the wireless setup information of the wireless LAN master device.

According to the configuration described above, a screen that prompts the reading of the wireless setup information of the wireless LAN master device by the scanning unit is displayed on the display unit. Since an instruction is displayed on the screen to be issued to the operator, the operator can easily recognize the content, so that the operation can be more easily understood and the workability can be improved.

According to a configuration in another aspect of the present disclosure, the control unit causes, upon acquiring an SSID receivable by the wireless communication unit based on the wireless setup information acquired, the display unit to display the SSID acquired and causes, upon acquiring two or more of the SSIDs, the display unit to display a screen that prompts selection of one SSID from the SSIDs displayed on the display unit.

According to the configuration described above, the receivable SSIDs are acquired, and the SSIDs acquired is displayed on the display unit. When two or more SSIDs are received, the screen that prompts the selection of one SSID from the SSIDs displayed on the display unit is displayed on the display unit. When the completely matching information cannot be restored by the optical information recognition processing based on an image, the receivable SSIDs are displayed to prompt the selection, so that the operability can be prevented from being compromised even when the optical information recognition processing fails to find the complete match.

According to a configuration in another aspect of the present disclosure, the control unit causes the display unit to display an SSID that does not match the SSID included in the wireless setup information read but has characters partially matching those of the SSID.

According to the configuration described above, SSIDs that do not match the SSID included in the wireless setup information read but have characters partially matching are displayed by the display unit. With this configuration, when the character recognition processing fails to find the complete match, the SSIDs are narrowed to those that are likely to match instead of displaying all the SSIDs. Thus, the operability can be prevented from being compromised.

According to a configuration in another aspect of the present disclosure, a touch panel is included, and the control unit causes the touch panel to display a start button for starting the reading of the wireless setup information of the wireless LAN master device by the scanning unit.

According to the configuration described above, the start button for starting the reading of the wireless setup information of the wireless LAN master device by the scanning unit is displayed on the touch panel.

In a configuration of another aspect of the present disclosure, the wireless setup information includes an SSID and an encryption key.

According to a configuration in another aspect of the present disclosure, a storage unit configured to store information is included, and the control unit causes the storage unit to store, when wireless connection with the wireless LAN master device is successful, character information in the wireless setup information of the wireless LAN master device.

According to the configuration described above, when the wireless connection with the wireless LAN master device is successful, the character information in the wireless setup information of the wireless LAN master device is stored in the storage unit. Because character information is stored when the wireless connection is successful, only error-free information can be stored.

According to a configuration in another aspect of the present disclosure, the control unit determines whether wireless LAN connection is available at time of startup and executes a wireless connection setup mode when the wireless LAN connection is not available.

According to the configuration described above, it is determined whether the wireless LAN connection would succeed at time of startup and the wireless connection setup mode is executed when the wireless LAN connection would fail. When the wireless LAN connection can be established at the time of startup, the wireless connection setup mode needs not to be executed, meaning that the operator can be free of the cumbersome procedure.

According to a configuration in another aspect of the present disclosure, a method of setting wireless setup information for an image reader including a scanning unit configured to read an original document provided with an image and convert the image into image data, a control unit configured to control the reading of the image by the scanning unit, and a wireless communication unit using a wireless LAN, the control unit being configured to execute optical information recognition processing on the image data, includes by the scanning unit, reading an original document provided with wireless setup information allocated to a wireless LAN master device, executing the optical information recognition processing on image data of the wireless setup information read, to recognize character information provided, and acquiring wireless setup information for connection to the wireless LAN master device based on the character information acquired.

DESCRIPTION OF EXEMPLARY EMBODIMENTS

Below, exemplary embodiments according to the present disclosure will be described with reference to the drawings.

Figure 1:
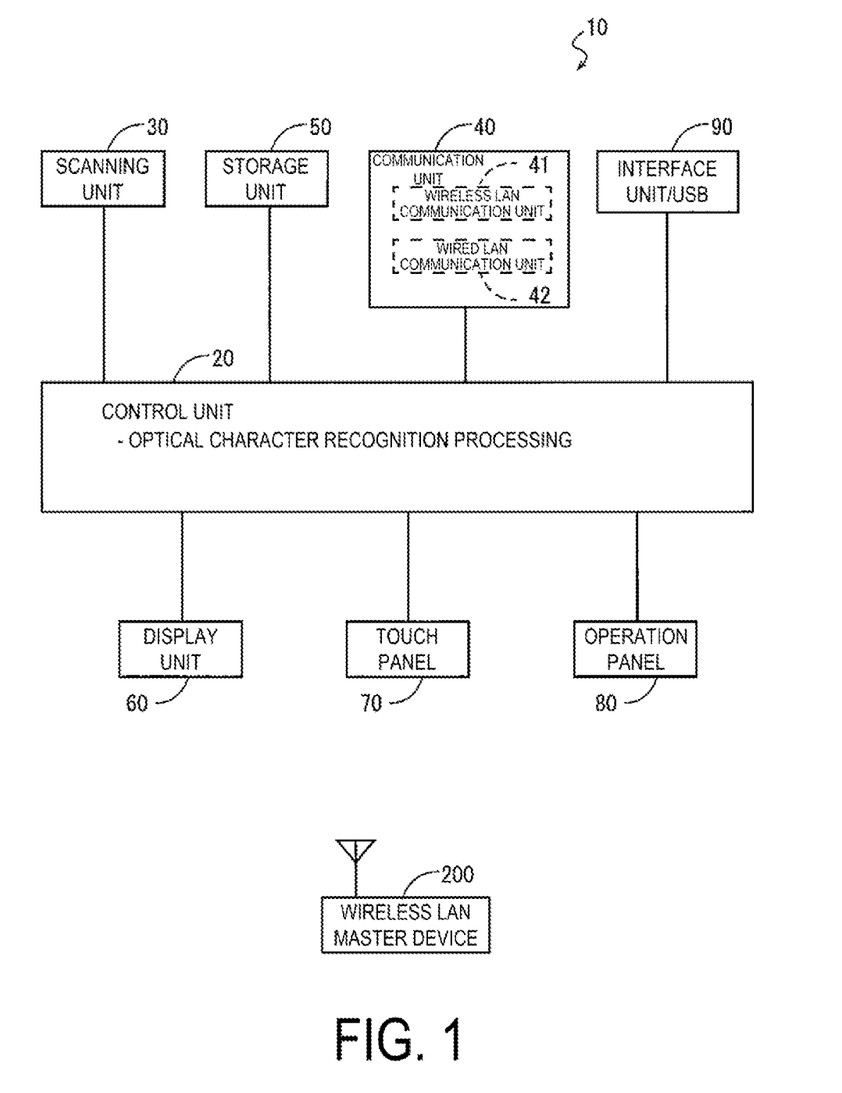
FIG. 1 is a block diagram illustrating a schematic configuration of a scanner according to an embodiment of the present disclosure.

FIG. 1 is a block diagram illustrating a schematic configuration of a scanner according to an embodiment of the present disclosure.

In the figure, a scanner 10, which is an image reader of the present disclosure, includes a control unit 20 that performs various controls. The control unit 20 includes an ASIC incorporating a CPU, a ROM, a RAM, an IO port, and the like. The control unit 20 performs various processes. As one of such processes, optical information recognition processing including optical character recognition (OCR) processing may be performed. In this example, the optical character recognition (OCR) processing means processing including: inputting image data as a result of optically reading characters printed on a paper medium and the like, recognizing character information in an image represented by the image data, and converting the character information into corresponding character data. In addition to characters recognized by the OCR processing, information other than characters, such as barcodes and two dimensional code, is recognized through the optical information recognition processing. The optical information recognition processing is assumed to be widely applicable to parts simply referred to as the OCR processing below.

The scanner 10 includes a scanning unit 30 that reads an original document provided with an image and converts the image into image data. The scanning unit 30 includes a light emitting element, line sensors, and a transport device. The transport device transports a predetermined original document to orthogonally cross the line sensors. In this process, the line sensors performs conversion into image data for each photoreceptor element based on the wavelength and intensity of the reflected light from the original document. Then, the control unit 20 controls the reading of the image by the scanning unit 30, and the scanning unit 30 outputs the image data, obtained by the conversion, to the control unit 20.

The scanner 10 includes a communication unit 40. The communication unit 40 includes a wireless LAN communication unit (wireless communication unit) 41 and a wired LAN communication unit 42 for connecting to a network. Although the wired LAN communication unit 42 is provided in addition to the wireless LAN communication unit 41 in this example, only the wireless LAN connection may be implemented. The wireless LAN communication unit 41 can establish network connection with a wireless LAN master device 200 based on various wireless LAN standards. Information for establishing this wireless LAN connection with the wireless LAN master device 200 will be referred to as wireless setup information. This wireless setup information at least includes an SSID and an encryption key allocated to the wireless LAN master device 200.

The scanner 10 includes a nonvolatile storage unit 50, and thus can store and hold various pieces of data including the wireless setup information described above. The stored contents are written and read out by the control unit 20 as appropriate. The wireless setup information is stored in the storage unit 50 based on control by the control unit 20, and can be read out from the storage unit 50.

The scanner 10 includes a display unit 60, a touch panel 70, and an operation panel 80 that realize a user interface for an operator. The display unit 60 can display an image on a screen based on an instruction from the control unit 20. The touch panel 70 is disposed to cover the display unit 60, and outputs a signal, corresponding to the pressed position, to the control unit 20. The operation panel 80 includes various push button switches the pressing on which results in a contact change detected by the control unit 20 to detect the user operation. For example, a power switch or the like is configured.

The scanner 10 further includes an interface 90 including a USB terminal.

Figure 2:
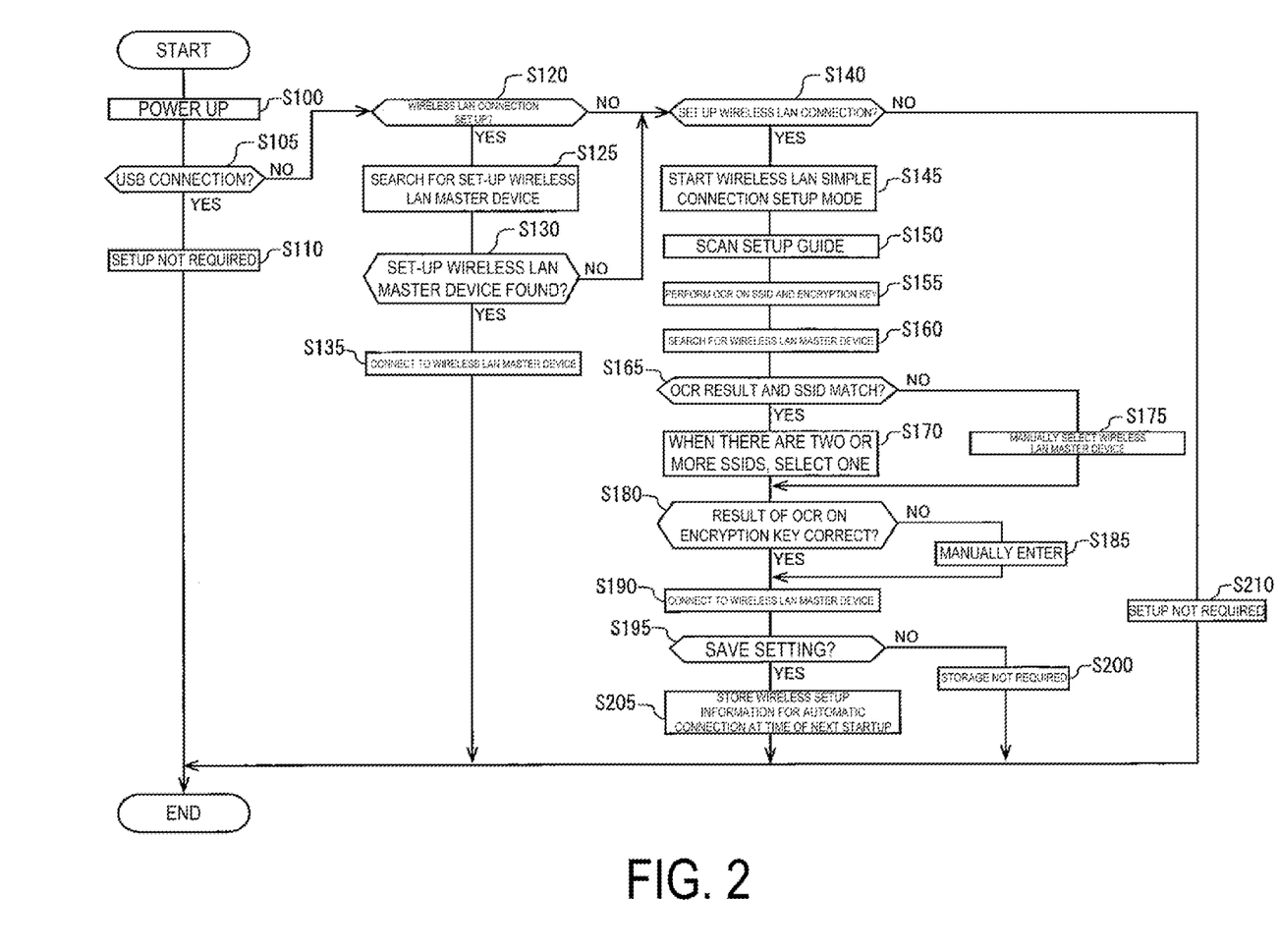
FIG. 2 is a flowchart illustrating processing of setting wireless setup information of the scanner.

FIG. 2 is a flowchart illustrating processing of setting wireless setup information of the scanner.

When the power switch is turned on in step S100, the control unit 20 determines whether the USB connection is established in step S105. The USB connection is determined to be established when an attempt to communicate with the external device through the interface 90 results in successful communications with an external PC. When the USB connection can be established, no wireless connection setup is required thereafter, and thus the processing proceeds to step S110 and is terminated.

When the USB connection is determined to be not established in step S105, the control unit 20 next determines, in step S120, whether wireless LAN connection has been setup. The presence or absence of the wireless LAN connection setup can be determined based on whether the wireless setup information is stored in the storage unit 50 for example. When the wireless LAN connection has been setup, in step S125, the control unit 20 searches for the corresponding wireless LAN master device 200 based on the wireless setup information that has been set up. The wireless setup information generally includes an SSID, with which the wireless LAN master device 200 is identified, and an encryption key. In the processing of searching for the wireless LAN master device 200, the control unit 20 controls the wireless LAN communication unit 41 to receive the SSID, and the wireless LAN communication unit 41 acquires the receivable SSIDs as much as possible. Then, the control unit 20 acquires a list of received SSIDs from the wireless LAN communication unit 41, and determines whether the SSID stored as the wireless setup information is included in the list.

Upon determining that there is the set-up wireless LAN master device 200 in step S130, the control unit 20 establishes the wireless LAN connection with the wireless LAN master device 200 in step S135 and terminates the processing.

On the other hand, when the wireless setup information is not stored in the storage unit 50 and when the acquired SSIDs do not include the SSID of the wireless setup information, neither the USB connection nor the wireless LAN connection can be established. The control unit 20 determines whether to perform the wireless LAN connection setup in step S140, and upon determining to perform the wireless LAN connection setup, starts and executes a wireless connection setup mode (Wireless LAN simple connection setup mode) in step S145. According to the processing up to this point, the wireless connection setup mode starts if the wireless LAN connection fails after the determination on the USB connection at the time of startup with the power switch turned ON.

In step S140, the control unit 20 makes a query to the user using the display unit 60, when determining whether to perform the wireless LAN connection setup. Note that when the wireless LAN connection setting is not required, the processing proceeds to step S210 and then is terminated.

Figure 3:
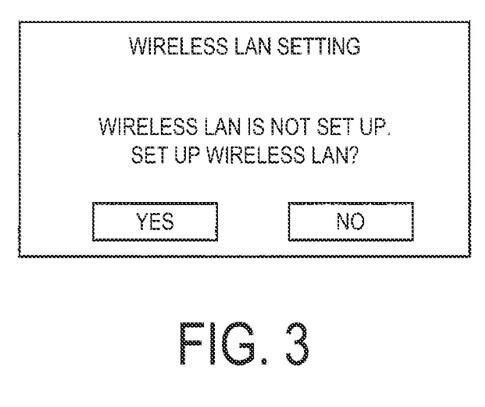
FIG. 3 is a diagram illustrating display for wireless setup information setting processing of the scanner.

FIG. 3 is a diagram illustrating an initial display for wireless setup information setting processing of the scanner.

As illustrated in FIG. 3, based on control by the control unit 20, the display unit 60 displays the title "Wireless LAN setting", and displays the message "Wireless LAN is not set up/Set up wireless LAN?" At the lowest section, "Yes" and "No" are displayed. The display unit 60 only displays these images. After instructing the displaying, the control unit 20 waits for the reception of the signal, indicating the coordinates of the portion pressed by the user, from the touch panel 70. Based on the signal, from the touch panel 70, indicating the coordinates of the pressed portion in the image displayed by the display unit 60, the control unit 20 can determine whether the user has issued an instruction for performing the wireless LAN setup, or an instruction for not performing the wireless LAN setup. Thereafter, the control unit 20 similarly determines the operation of the user based on the signal received from the touch panel 70.

Figure 4:
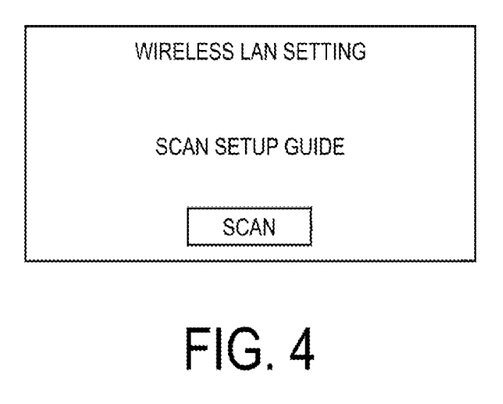
FIG. 4 is a diagram illustrating display for wireless setup information setting processing of the scanner.

FIG. 4 is a diagram illustrating the next display for wireless setup information setting processing of the scanner.

When the user has issued the instruction to perform the wireless LAN setting, the display unit 60 displays, based on the control by the control unit 20, the title "Wireless LAN setting", displays the message "Scan setup guide" therebelow, and displays "Scan" in the lowest section as illustrated in FIG. 4. This displaying represents processing of prompting the user to scan a setup guide which is an original document on which the wireless setup information is printed. The display "Scan" corresponds to "Start button with which the user starts the reading". After setting the setup guide on an original document feed portion (not illustrated) of the transport device based on the instruction, the user presses the portion corresponding to "Scan". Then, the control unit 20 detects that the "start button" is pressed based on the received signal from the touch panel 70 and scans the setup guide in step S150. Specifically, the transport device of the scanning unit 30 starts the transport of the setup guide, and image signal corresponding to each line is periodically received from the line scanners. As a result, the image signal in a main scanning direction is repeatedly received from the line sensors at a predetermined interval in a sub scanning direction, whereby image data representing an image including pixels in a dot matrix form can be acquired. When the transport of a single setup guide is completed by the transport device of the scanning unit 30, reception of the image data representing a single image is completed.

The control unit 20 performs optical character recognition (OCR) processing on the received image data. When the OCR is performed, character data corresponding to the characters included in the image is generated. Since the character data represents the character information, the control unit 20 determines, in step S155, whether the SSID and the encryption key are included in the character information. When the OCR result is output, character data arranged in the row direction and the digit direction is obtained. Thus, the character information is searched for character information that matches or is similar to "SSID", and the subsequent character information is acquired as the SSID. Similarly, character information that matches or is similar to "encryption key" or "password" is searched for, and the subsequent character information is acquired as the encryption key. The character information thus obtained represents the character information about the characters written. When the original document on which the wireless setup information is printed includes the SSID and the encryption key in a form of a barcode, processing of analyzing the barcode may be performed instead of the OCR processing.

Once the SSID and encryption key are obtained by the OCR, the control unit 20 searches for the wireless LAN master device 200 in step S160. Specifically, the control unit 20 makes the wireless LAN communication unit 41 acquire the receivable SSIDs and generate the list. At this point, all of the receivable SSIDs may be received, or some of the SSIDs may be acquired in descending order of radio wave intensity.

In step S165, the control unit 20 determines whether the list described above includes the SSID matching the SSID obtained by the OCR. If there are multiple matches, selection needs to be made.

Figure 5:
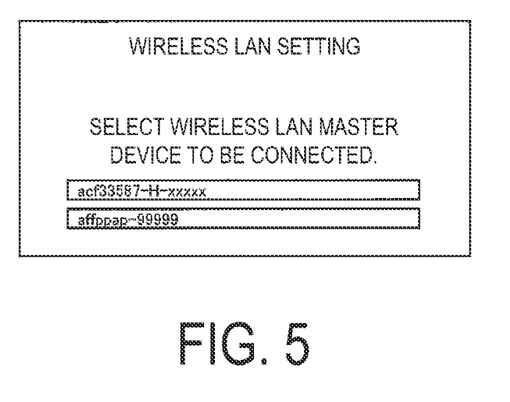
FIG. 5 is a diagram illustrating display for wireless setup information setting processing of the scanner.

FIG. 5 is a diagram illustrating the next display for wireless setup information setting processing of the scanner.

As illustrated in FIG. 5, in step S170, based on control by the control unit 20, the display unit 60 displays the title "Wireless LAN setting", and displays the message "Select wireless LAN master device to be connected" therebelow, and lists a plurality of SSIDs including the matching SSID therebelow. In many cases, a plurality of SSIDs and encryption keys are printed on the setup guide in accordance with the wireless LAN standards, meaning that a plurality of SSIDs including the matching SSID may be included.

The display prompts the user to perform an operation of selecting the SSID of the wireless LAN master device 200 to be connected, among the plurality of SSIDs including the matching SSID. In response to this, the user presses the display portion of the SSID to be connected, based on the SSID displayed on the setup guide. Then, the control unit 20 detects that the "SSID to be connected" is pressed, based on the signal received from the touch panel 70.

As described above, the control unit 20 makes the wireless LAN communication unit 41 acquire the receivable SSIDs based on the wireless setup information acquired, and makes the display unit 60 display the screen that prompts the selection when two or more SSIDs are received.

Based on the result of the selection, the control unit 20 attempts to communicate with the corresponding wireless LAN master device 200 in step S180, using the SSID and the corresponding encryption key. The wireless LAN master device 200 makes the slave device that has designated the SSID of the wireless LAN master device 200 in an attempt to receive the SSID send the encryption key, and determines whether the encryption key matches the encryption key held therein. When the keys match, the connection is permitted, and the subsequent protocol processing starts. When the keys do not match, the connection is rejected, and the processing does not proceed any further. When the procedure proceeds to the connection, the control unit 20 can determine that the encryption key is correct and that the wireless LAN connection would succeed, and proceeds to step S190 to establish the connection with the wireless LAN master device 200.

The OCR may be successfully performed depending on the condition of the image on the setup guide, but fails to properly recognize the characters in many cases. With the correct and incorrect result mixed, character information that is partially correct and partially incorrect is obtained in many cases. In the case of encryption key, the user needs to re-input the correct encryption key. In step S185, the control unit 20 makes the user manually input the correct encryption key using the display unit 60 and the touch panel 70.

On the other hand, in the case of SSID, based on the fact that there are receivable SSIDs, the SSIDs may be limited to those that are similar to the SSID. Specifically, as a measure for incorrect result of the OCR processing, as in step S175, the receivable SSIDs may be displayed for the manual selection, or SSIDs may be narrowed down to those similar to the OCR result for the selection. More specifically, the control unit 20 may make the wireless LAN communication unit 41 acquire the receivable SSIDs, and make the display unit 60 display the SSIDs that do not match but are similar to the SSID included in the wireless setup information read.

As an example of the similarity determination, an SSID that does not match the SSID included in the wireless setup information read, but includes characters partially matching may be determined to be similar. Specifically, SSIDs that do not match the SSID included in the wireless setup information read but have characters partially matching are displayed by the display unit.

With this configuration, when there are multiple connectible devices, the OCR results can be narrowed down to similar SSIDs to be displayed, so that the selection from the devices can be made easy.

When the connection is successful, the wireless setup information used for the connection may be stored in the storage unit 50 to be available for the next opportunity.

Figure 6:
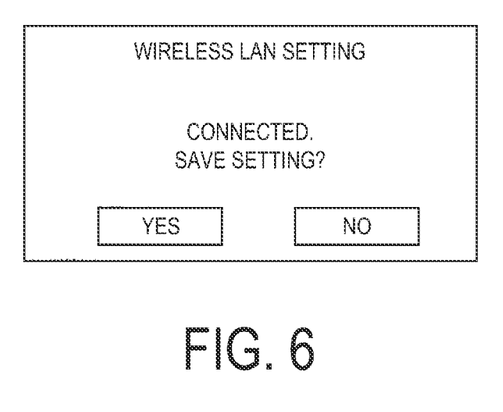
FIG. 6 is a diagram illustrating display for wireless setup information setting processing of the scanner.

FIG. 6 is a diagram illustrating the last display for wireless setup information setting processing of the scanner.

As illustrated in FIG. 6, based on control by the control unit 20, in step S195, the display unit 60 displays the title "Wireless LAN setting", and displays the message "Connected/Save settings?" therebelow. At the lowest section, "Yes" and "No" are displayed. Based on the signal, from the touch panel 70, indicating the coordinates of the pressed portion in the image displayed by the display unit 60, the control unit 20 can determine whether the user has issued an instruction for saving the setting, or for not saving the setting. When the setting is selected to be saved, in step S205, the control unit 20 makes the storage unit 50 store the wireless setup information with which the connection has been successful, and sets a predetermined flag in the storage unit 50 for the automatic connection at the time of next startup. Then, the processing is terminated. When the setting is selected not to be saved, the saving is determined to be not necessary in step S200, and the processing is terminated.

In the present disclosure as described above, in step S140, based on control by the control unit 20, the display unit 60 displays the message "Wireless LAN is not set up/Set up wireless LAN?" When an instruction to perform the wireless LAN setup is input, in step S150, the display unit 60 displays the message "Scan setup guide" to prompt the scanning of the setup guide. When "Read start button" is operated, the setup guide is scanned. The control unit 20 executes the OCR (optical character recognition processing or optical information recognition processing in a broader sense) on the received image data, and upon acquiring the SSID and the encryption key, attempts to communicate with the corresponding wireless LAN master device 200 using the SSID and the corresponding encryption key in step S180.

Steps of the processing of setting the wireless setup information in this manner can also be construed as a method. Accordingly, the above-described processing corresponds to the method of setting wireless setup information.

Note that the present disclosure is not limited to the examples described above. One of ordinary skill in the art will recognize that applying modifications in combinations of mutually displaceable members, configurations, and the like disclosed in the examples described above as appropriate, applying replacement with or modifications in combinations with members, configurations, and the like that are not disclosed in the examples described above but are mutually displaceable with the members, configurations, and the like disclosed in the examples described above in known techniques as appropriate, and applying replacement with or modifications in combinations with members, configurations, and the like that are not disclosed in the examples described above but may be conceived as substitutes for the members, configurations, and the like disclosed in the examples described above by one of ordinary skill in the art based on known techniques or the like are disclosed as an example of the present disclosure.

What is claimed is:

1. An image reader comprising:
   a scanning unit configured to read an original document provided with an image and convert the image into image data;
   a display unit;
   a control unit configured to control the reading of the image by the scanning unit; and
   a wireless communication unit using a wireless LAN and acquiring one or more SSIDs receivable from wireless devices, wherein
   the control unit is configured to execute optical information recognition processing on the image data,
   the control unit is configured to cause the scanning unit to read an original document provided with wireless setup information allocated to a wireless LAN master device, to execute the optical information recognition processing on image data of the wireless setup information read, to recognize predetermined information, and to acquire wireless setup information for connection to the wireless LAN master device based on the predetermined information acquired, and
   the control unit causes the display unit to display an SSID, which does not match the SSID included in the wireless setup information optically recognized but has characters partially matching those of the SSID included in the wireless setup information optically recognized, from the one or more SSIDs.

2. The image reader according to claim 1, wherein
   the control unit causes the display unit to display a screen that prompts the reading, by the scanning unit, of the wireless setup information of the wireless LAN master device.

3. The image reader according to claim 2, wherein
   The control unit causes, upon acquiring an SSID receivable by the wireless communication unit based on the wireless setup information acquired, the display unit to display the SSID acquired and causes, upon acquiring the one or more SSIDs, the display unit to display a screen that prompts selection of one SSID from the one or more SSIDs displayed on the display unit.

4. The image reader according to claim 1, comprising a touch panel, wherein
   the control unit causes the touch panel to display a start button for starting the reading of the wireless setup information of the wireless LAN master device by the scanning unit.

5. The image reader according to claim 1, wherein
   the wireless setup information includes the SSID and an encryption key.

6. The image reader according to claim 1, comprising a storage unit configured to store information, wherein
   the control unit causes the storage unit to store, when wireless connection with the wireless LAN master device is successful, character information in the wireless setup information of the wireless LAN master device.

7. The image reader according to claim 1, wherein
   the control unit determines whether wireless LAN connection is available at time of startup and executes a wireless connection setup mode when the wireless LAN connection is not available.

8. A method of setting wireless setup information for an image reader being configured to execute optical information recognition processing on image data and including:
   a scanning unit configured to read an original document provided with an image and convert the image into image data; and
   a wireless communication unit using a wireless LAN, the method comprising:
   by the scanning unit, reading an original document provided with wireless setup information allocated to a wireless LAN master device;
   executing optical character recognition processing on image data of the wireless setup information optically recognized, to recognize character information provided;
   acquiring wireless setup information for connection to the wireless LAN master device based on the character information acquired;
   acquiring one or more SSIDs receivable from wireless devices; and
   displaying an SSID, which does not match the SSID included in the wireless setup information optically recognized read but has characters partially matching those of the SSID included in the wireless setup information optically recognized, from the one or more SSIDs.

* * * * *